United States Patent [19]

Vassilevsky, deceased

[11] 3,816,147

[45]* June 11, 1974

[54] LIGHT-WEIGHT HIGH-STRENGTH CEMENT COMPOSITIONS USING HYDROLYZED ORGANIC MATERIAL

[75] Inventor: Anatole N. Vassilevsky, deceased, late of West Haven, Conn. by Irene Vassilevsky, executrix

[73] Assignee: V. R. B. Associates, Inc., Lincolndale, N.Y.

[ * ] Notice: The portion of the term of this patent subsequent to June 11, 1989, has been disclaimed.

[22] Filed: June 21, 1971

[21] Appl. No.: 155,262

Related U.S. Application Data

[63] Continuation-in-part of Ser. No. 829,158, May 26, 1969, Pat. No. 3,667,978, Continuation-in-part of Ser. No. 570,743, Aug. 8, 1966, Pat. No. 3,447,938, Continuation-in-part of Ser. No. 306,702, Sept. 5, 1963, abandoned.

[52] U.S. Cl. .................................. 106/105, 106/108
[51] Int. Cl. ......................... C04b 9/02, C04b 9/14
[58] Field of Search .......... 106/105, 106, 107, 108, 106/120, 121, 85, 93

[56] References Cited
UNITED STATES PATENTS

| | | | |
|---|---|---|---|
| 382,740 | 5/1888 | Straub | 106/93 |
| 2,592,345 | 4/1952 | Schnell et al. | 106/93 |
| 3,311,483 | 3/1967 | Garnier | 106/93 |
| 3,403,205 | 9/1968 | Ottenholm | 106/93 |
| 3,667,978 | 6/1972 | Vassilevsky | 106/105 |

*Primary Examiner*—James E. Poer
*Attorney, Agent, or Firm*—Karl F. Ross; Herbert Dubno

[57] ABSTRACT

A hydraulic cement binder consisting of magnesium oxide, magnesium sulfate and calcium chloride in proportion such that a magnesium oxychloride/magnesium oxysulfate/calcium sulfate hardenable mass is produced upon addition of water and setting. The binder is combined with cellulosic waste (municipality trash) which is treated with HCl or $H_2SO_4$ to partially hydrolyze the cellulosic material and thereafter with magnesium oxide or carbonate to neutralize it. For decreased brittleness and increased waterproofing characteristics, the binder contains sodium silicate and silicofluoride.

4 Claims, No Drawings

LIGHT-WEIGHT HIGH-STRENGTH CEMENT COMPOSITIONS USING HYDROLYZED ORGANIC MATERIAL

CROSS-REFERENCE TO COPENDING APPLICATION

This application is a continuation-in-part of the copending application Ser. No. 829,158 filed 26 May 1969 (now U.S. Pat. No. 3,667,978) as a continuation-in-part of then pending application Ser. No. 570,743 filed 8 Aug. 1966 (now U.S. Pat. No. 3,447,938) as a continuation-in-part of application Ser. No. 306,702 filed 5 Sept. 1963, since abandoned.

FIELD OF THE INVENTION

The present invention relates to improved magnesia cement compositions suitable for use as hydraulic binders in compositions containing various types of fillers.

BACKGROUND OF THE INVENTION

In the aforementioned applications, it has been pointed out that magnesia cements have been known in the art for nearly one hundred years and that a class of cements, identified hereinafter as SOREL cements, make use of calcined magnesia and magnesium chloride to form a more or less complex salt which can be characterized generally as a hydrate form of magnesium oxychloride.

The discovery that such a hydraulic binder could be used with organic wastes to form hardenable cementitious materials represented perhaps the most significant advance in the field since the development of the Portland cements.

Portland cements, however, require relatively pure aggregates, predominantly clean silica sand, and are totally unsuitable for use with organic matter and natural soils, earths, and clays containing such organic matter.

It is understood that Portland cements can be used effectively in construction only when a washed, sieved or otherwise purified and clean sand is employed.

Thus the SOREL cements were capable of overcoming a substantial disadvantage of the conventional Portland cements inasmuch as they are capable of operating with organic constituents in the filler material. In fact, many patents have issued since the discovery of the SOREL composition, substantially all of which propose SOREL-type cements which can be considered exclusively magnesium oxychlorides.

A typical composition of this type requires the combination of magnesia and magnesium chloride in stoichiometric quantities equivalent to the formula $MgCl_2 \cdot 5MgO \cdot 17H_2O$. The basic SOREL system required that the calcined magnesia (MgO) be admixed with an aqueous solution of magnesium chloride ($MgCl_2$) to form the binder with obvious disadvantages.

Subsequent workers were able to eliminate the formulation problems by generating the magnesium chloride component *in situ* by reacting magnesium sulfate with a chloride whose sulfate salt was substantially insoluble so that the reaction, as far as the sulfate and chloride ions are concerned, was a simple exchange with total precipitation of sulfate or the tying of this ion into an insoluble compound.

Thus it has been proposed to form the stoichiometric quantity of the magnesium chloride required for the SOREL system by admixing barium chloride with the stoichiometric equivalent of magnesium sulfate. When this is done, all of the sulfate is apparently tied up as the insoluble barium sulfate salt while all of the chloride appears as magnesium chloride.

All of these SOREL-type cements have the significant disadvantage that, when they are prepared as powdered binders for later admixture with a filler, they are hygroscopic and have relatively poor shelf life. Furthermore, when compositions are formed of such binders and organic fillers, ordinary soil or clay or the like, the cost of such compositions is relatively high, the compressive strength is not necessarily always satisfactory and the long-term durability of the composition appears to be limited. In any event, it has been found to be impractical to use SOREL-type cements in large-scale construction even in countries where high-quality sand and like fillers are not available and where skilled workers are unavailable.

OBJECTS OF THE INVENTION

It is the principal object of the present invention, therefore, to provide an improved hydraulic binder for hardenable cementitious compositions in which the advantages of SOREL-type cements are retained and the disadvantages thereof are obviated.

A further object of this invention is to provide a cementitious material suitable for use as a binder for fillers containing organic matter (e.g., garbage and similar municipal and industrial wastes) and of relatively low cost so as to render the cementitious material highly suitable for use in regions where high-quality fillers are unavailable.

Still another object of the invention is to provide an improved hydraulic cement composition extending the principles of the aforementioned applications.

SUMMARY OF THE INVENTION

These objects and others which will become apparent hereinafter are attained in accordance with the present invention which is based upon the surprising discovery that an excellent hydraulic-cement binder for both organic and inorganic fillers is constituted of magnesium oxide, magnesium sulfate and an alkaline-earth metal chloride (e.g., calcium chloride, barium chloride and strontium chloride), when the magnesium oxide is present in an amount by weight exceeding that of the magnesium sulfate and the alkaline-earth metal chloride is present in at least 10 percent by weight of the cement but in a molar quantity less than that of the magnesium sulfate. More specifically, it has been found that excellent binders can be prepared without the danger that hygroscopicity will cause deterioration of the hydraulic cement before it is combined with water and a filler, and which yields a hardenable composition with inorganic and organic fillers of substantially all types with characteristics approaching those of the highest-quality Portland cement compositions.

I have discovered, most surprisingly, that the system of the present invention is particularly advantageous in the conversion of municipal and area wastes, especially cellulose-containing garbage, into useful materials. More particularly, it has been found that cellulose-containing garbage, i.e., garbage containing paper, cardboard, vegetable wastes and, in general, municipal garbage of all forms from which indigestible materials such as metal and synthetic resin have been removed, can be digested or hydrolyzed using hydrochloric acid and/or sulfuric acid and/or silicofluoride acid to yield a product which can be combined with the cement of the present invention, or ingredients thereof, to provide a hardenable composition of high compressive strength, light weight and low cost. One of the most surprising facts is that the waste-containing concrete of the present invention need contain no mineral aggregate. The hydrolyzed filler according to the present invention may be present in an amount up to 70 percent by weight of the overall composition (hardened concrete) and may be used in lesser quantities as desired.

According to a feature of the present invention, therefore, the organic waste material, containing at least some hydrolyzable cellulose, is treated with hydrochloric acid, sulfuric acid or silicofluoride acid (fluosilicic acid) for a period at least sufficient to bring about particle hydrolysis of the cellulose-containing components. The hydrolysis level should reach at least 10 percent. After hydrolysis, the waste composition is neutralized with magnesium oxide or magnesium carbonate to a pH of 6.8 to 7.2, thereby producing the magnesium salt of the corresponding acid. As will become apparent hereinafter, the cementitious composition of the present invention has, at its starting point, certain proportions of magnesium chloride and magnesium sulfate as well as some alkaline-earth fluoride so that the hardened bonding material can be considered to be a hydrated multiple salt of magnesium chloride, magnesium sulfate, magnesia and alkaline-earth sulfate. According to the present invention, all or part of the chloride or sulfate (or both) may be provided by neutralization of the cellulosic material and then combining the cellulosic material with the powdered substances forming the remainder of the binder.

Still another feature of this invention resides in the formation of a ceramic having a compressive strength equivalent to that of pyroceram. For example, when glass powder is a proportion of up to 70 percent by weight is combined with the hydraulic-cement powder of the present invention and mixed with water and cast, the hardened body has a compressive strength of up to 3,000 lbs per square inch and a ceramic-like character.

Where low-density hardenable compositions are desirable, it is possible to combine the glass powder with the cellulosic material, in which case the latter is partially hydrolyzed with further silicic acid to increase the bonding to the glass. The hydrolyzing acid may be used in any convenient dilution, preferably with an acid strength no less than 12 percent, although higher concentrations are desirable.

The invention is based upon the fact that the binder, when combined with water and permitted to set, appears to be a highly complex magnesium oxychloride-oxysulfate and this complex appears to have a binding strength, resistance to abrasion, durability and stability far exceeding the corresponding characteristics of both magnesium sulfate cement and SOREL-type magnesium chloride cement. The alkaline-earth-metal chloride forms, upon admixture of the binder with water, a more or less insoluble sulfate by double displacement with the magnesium sulfate, the resulting calcium, barium or strontium sulfate forming a filler bound in the complex. Unlike prior SOREL cements, however, only a fraction of the magnesium sulfate component is converted into magnesium chloride while the balance remains in the sulfate form. The hardened composition is thus an oxychloride/oxysulfate of unique characteristics.

While the hardened cement binder of the present invention will be referred to hereinafter as essentially a magnesium oxychloride/sulfate, it will be understood that it is likely to contain the following species:

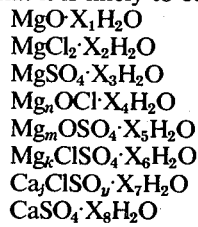

where $X_1$ through $X_8$ represent water of hydration and the alkaline-earth metal is, for purposes of illustration, indicated as calcium. The subscripts $j$, $k$, $m$, $y$ and $n$ represent integral or fractional values depending upon the actual composition of the particular portion of the complex. Each of these species appears to be present in chemical combination with the balance in the hardened binder, and further chemical bonds connect the binder with the filler. Thus the hardened binder can be described as having the empirical formula:

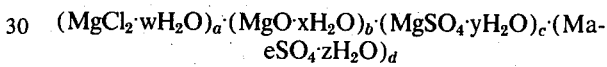

where Mae is an alkaline-earth metal selected from the group consisting of calcium, barium and strontium; $w$, $x$, $y$ and $z$ are units representing molecules of water of hydration; and $a$ ranges between 1 and 3,
    $b$ ranges between 12.5 and 15.5,
    $c$ ranges between 1.5 and 2.2, and
    $d$ ranges between 1 and 3.

The foregoing molecular relationships are based upon the discovery that best results are obtained when the hydraulic cement, which is designed to be mixed with mater and inorganic or organic fillers, consists in its powdered form of anhydrous magnesium sulfate present in an amount ranging between 2.8 and 3.3 parts by weight, anhydrous magnesium oxide present in an amount ranging between 4.5 and 5.5 parts by weight and the alkaline-earth metal chloride present in anhydrous form and in an amount ranging between 1 and 3 parts by weight, taking into consideration the fact that the $MgCl_2$ and $MgSO_4$ proportions should be adjusted to compensate for the quality generated by neutralization.

It is essential in accordance with the principles of this invention that the foregoing proportions be maintained for most satisfactory results with inorganic and organic fillers which do not require prior preparation. Such fillers include cellulosic materials, ordinary earth, and the like. Another critical aspect of this invention is that the alkaline-earth metal chloride, the magnesium oxide and the magnesium sulfate are calcined individually prior to their combination to form the hydraulic cement composition.

The resulting cement has an excellent shelf life, a surprising fact in view of the tendency of calcium chloride, for example, to interact with magnesium sulfate in a double-displacement reaction. Furthermore, it has been discovered that the cement, when prepared in this fashion, combines with water and probably the filler in a highly exothermic reaction which yields a setting rate far superior to any obtainable with SOREL-type cement and increasing both the strength of the bond to organic and inorganic fillers and the rate of formation of a hard abrasion-resistant and nonhygroscopic body.

The fillers suitable for use with the hydraulic-cement binder of the present invention can include inorganic materials such as ordinary sand, gravel, metallurgical slag, aluminum silicates, metal (e.g., aluminum) powder and asbestos, as well as organic fillers, usually of the cellulosic type. Suitable organic fillers, other than the cellulose-containing gargabe, include cellulose, wood fibers, sawdust, wood chips, corn cobs, bagasse, leaves, waste fiber and residual materials of oil-pressing processes.

More generally, the filler may be constituted at least in major part ordinary earth which contains inorganic components as well as organic fibers and other organic constituents. For proper setting of the cement it is advisable that the water supplied throughout and incorporated in the binder as water of hydration or crystallization should not exceed 25 percent of the total mass of the hardened composition.

The physical characteristics of the hardened cement, regardless of the filler chosen, are easily reproducible and compare favorably with the other magnesia cements mentioned earlier as well as the highest quality Portland cements currently available. For example, the hardened compositions of the invention generally have crushing strengths of the order of magnitude of 175 kg/cm$^2$, a modulus of rupture essentially 65 kg/cm$^2$ and a modulus of elasticity in the range of essentially 4,625 kg/cm$^2$ for a typical composition; the composition was also able to resist a flexure stress of about 54 kg/cm$^2$.

The cement according to the invention will withstand temperatures of up to 800°C even with sawdust used as a filler; it does not rot, and it is not attacked by termites or by rats and other rodents.

Moreover, it has been ascertained that the improved composition of the present invention has excellent resistance to fire and moisture, atmospheric conditions and heat without requiring additional substances to modify the inherent characteristics of the composition. Furthermore, the binder is capable of use with substantial quantities of filler (e.g., ranging to, say 60 percent – 70 percent of the composition). This is especially important when the final hardened material is to have a low specific gravity. It has been found further that it is desirable to select the filler so that it contains an aluminum silicate or silica component whose proportion, by comparison with earlier compositions, is relatively low and may range between 5 and 35 percent by weight of the entire composition prior to the admixture of water therewith. A typical system thus includes the hydraulic cement prepared as described above, an organic filler and a silica or aluminum silicate filler in the proportion indicated. By incorporation of suitable bactericidal and fungicidal agents, the materials prepared for the cements may be made highly resistant to attack by such microorganisms.

It has now been found to be possible to decrease further the hygroscopicity of the improved hydraulic cement binder by adding thereto minor proportions of silicates, especially calcium or sodium silicate, which have been found to yield a composition which is substantially waterproof and less brittle than the products using the improved hydraulic cement binder of the present invention in the absence of such silicates.

More particularly, between about 6 and 15 percent by weight of calcium or sodium silicate may be combined with the hydraulic cement binder prior to its use in the cementitious composition. Moreover, it has been discovered that, when sodium silicates are used in conjunction with 3 to 15 percent by weight of sodium silicofluoride, the improvement from the point of view of waterproof characteristic and reduced brittleness is synergistic in nature.

Sodium silicate and/or silcofluoride is present between 4 and 15 percent by weight.

While it has not been ascertained to the present time precisely how the silicates and silicofluorides interact with one another and with the other components of the cementitious binder, it appears that the reaction upon addition of the cement containing these additives to water is relatively complex. The binding components of the hydraulic cement is a complex oxychloride/oxysulfate salt compound, as has been described previously, and it would appear that the presence of the silicates and the silicofluoride gives rise to calcium silicate, insoluble compounds of sodium and calcium fluoride and calcium silicate and silicate hydroxide. When water is added to this type of cement, it can be assumed that first there is an initial production of gypsum ($CaSO_4 \cdot 3H_2O$) which fills capillaries between the building materials and fillers. It is thus an important characteristic of the invention that the filler should contain capillary materials, e.g., organic fibers. The next reaction appears to be the product of the complex compounds of the oxysalts of the type:

$$[MgO \cdot MgSO_4]_A \cdot [MgO \cdot MgCl_2]_B$$

where A is always larger than B in accordance with the aforedescribed principles. Still later, calcium silicate appears to be formed by the reaction of calcium chloride and sodium silicate in the improved composition of the present invention in accordance with the relationship $$CaCl_2 + Na_2SiO_3 \rightarrow 2NaCl + CaSiO_3.$$

Finally, the sodium silicofluoride appear to react with the sodium silicate $$Na_2SiF_6 + 6H_2O + 2Na_2SiO_3 \rightarrow 6NaF + 3Si(OH)_3.$$

The formation of sodium fluoride and silicate hydroxide appears to add to the binding capabilities of the cement and reduces brittleness, while increasing the waterproof characteristic thereof. The sodium silicate and sodium silicofluoride may be added to the cement in a total amount ranging between 10 to 15 percent by weight, in total, with the sodium silicofluoride making up about 40 percent of the amount and the sodium silicate about 60 percent. Preferred proportions are 6 percent of sodium silicofluoride and 9 percent of sodium silicate as additives to the binder prepared as described previously.

It has also been found that it is possible to treat cellulosic material to improve its integration into the composition and, moreover, to improve the compressive strength of the product made thereby. According to this aspect of the invention, the cellulosic materials (e.g.) sawdust, straw, sugarcane, residues, corncobs, chaff, leaves), are thoroughly wetted and mixed with acidic digesting solutions for a period of 3 to 5 hours to induce partial hydrolysis of the cellulose. The acid concentration is preferably 12 to 16 percent and hydrochloric, sulfuric or fluosilicic ($H_2SiF_6$) acids may be used individually or in mixtures. Preferably hydrochloric acid is used in admixture with sulfuric acid or fluosilicic acid.

Following the hydrolysis step, the cellulosic materials are neutralized with a mixture of magnesium carbonate or with a mixture of calcium carbonate and calcium chloride, or with powder dolomite containing both magnesium carbonate and calcium carbonate to a pH of 6.8 to 7.2. The exothermicity of this reaction results in the heating of the cellulosic materials whcih are then thoroughly mixed and permitted to stand for ½ to 1 hour. Any water which may be evaporated as a result of overheating should be restored to maintain the moisture contact substantially at the level prior to the neutralization step. The neutralized mass may then be combined with the hydraulic cement binder of the present invention. It is also possible to make pressed boards, blocks or plates with these binders by adding to the neutralized binder a calcined magnesium oxide powder, e.g., in the amount of 75 to 80 parts by weight per 70 parts by weight of the cellulosic material, in which case the binder may be dispensed with, although preferably the binder is combined with this mass.

Prior to use, the organic cellulose-containing material is comminuted by shredding, chopping or thermal decomposition and digested with the acid. Where necessary, the cellulose-containing waste material can be combined with wood scraps, sawdust, wood shavings, straw, grass, bamboo, grain husks and sugar-refining wastes. The comminuted product is then treated with at least the hydrochloric acid and preferably a mixture of hydrochloric and sulfuric acids in the proportions in which the chlorides and sulfates are to be found in the final product, excluding, of course, the chloride to be contributed by the alkaline/earth metal compound. After hydrolysis, the composition is neutralized to the extend indicated earlier with magnesium oxide or magnesium carbonate, whereupon the neutralized material, in the form of a sludge or slurry, can be stored. When the slurry is about to be used, additional magnesium oxide and the appropriate quantity of alkaline/earth chloride (if desired, additional magnesium sulfate) can be supplied to form the composition. Surprisingly, the product is nonflammable, even with 70 percent by weight cellulose, is immune to rotting, is not damaged by insects or rodents, can be shaped by casting, sawing or machining and is of low cost. Furthermore, its thermal conductivity is low and it can be used as an effective insulator against heat and electricity.

The invention is illustrated hereinafter by a number of specific examples representing the best mode currently known for carrying out the invention in practice:

Cement No. 1

5 parts by weight of aluminum silicate or silica, 40 parts by weight of previously calcined magnesium oxide, or an equivalent amount of previously calcined magnesite, 20 parts by weight of barium chloride and 20 parts by weight of calcined magnesium sulfate are mixed, ground to a fine powder, and stored in polyethylene bags or other suitable airtight containers. The calcination is carried out at 750° to 780°C.

Cement No. 2

2 parts by weight of aluminum silicate or silica, previously calcined at 250° – 300°C, are mixed with 5 parts by weight of calcined magnesia or magnesite and the mixture is ground (Powder A). Separately, 2 parts by weight of previously calcined barium chloride and 1 part by weight of strontium chloride are mixed and ground together (Powder B). Thereupon the Powders A and B are mixed in a weight ratio of 2:1, and 3 parts by weight of magnesium sulfate are added to the mixture which is then stored as in the case of Cement No. 1.

Cement No. 3

The ingredients enumerated below are separately subjected to a preliminary calcination at 350°C and then, after cooling, are mixed in the following proportions:

5 parts by weight of silica
48 parts by weight of calcined magnesite
29 parts by weight of calcined magnesium sulfate
10 parts by weight of calcined calcium chloride
8 parts by weight of calcined strontium chloride.

The mixture is ground to a fined powder and, if necessary, subjected to additional drying. Thereupon it is stored as in the case of Cement No. 1.

The following Examples are given to illustrate the manner in which the aforementioned cements are used in the preparation of hardened compositions:

EXAMPLE I 80 parts by weight of Cement No. 1, 2 or 3 is mixed with 50 parts by weight of water to a consistency of heavy cream. Then there is added 30 parts by weight of sawdust, and the slurry is stirred to uniform consistency. It is then poured into molds and allowed to set in the open air without heating.

EXAMPLE II 20 parts by weight of Cement No. 1, 2 or 3 is mixed with 12 parts by weight of water to a consistency of a heavy cream. Then there is added 7 parts by weight of sawdust and 5 parts by weight of sand. The resulting slurry is placed in a mold with application of pressure as the mixture is fairly dry and does not flow freely.

EXAMPLE III 20 parts by weight of Cement No. 1, 2 or 3 is mixed with 12 parts by weight of water, and to this mixture 10 parts by weight of stone powder is added. The mixture is stirred until a thick slurry is obtained, and then treated as in Example I.

In addition to casting or molding, the cement in slurry may be used to impregnate cardboard, plywood or wood panels, thereby producing noncombustible, waterproof, stony panels of superior strength.

The materials prepared in accordance with the present invention are well suited for a wide variety of applications. In the field of building construction, for example, hollow bricks made from these materials provide good thermal and acoustic insulation. Sheets and panels made by means of the cements of the invention can be used for flooring, in the construction of driveways, walks, stairs, and terraces. Building materials prepared with these cements lend themselves ideally to prefabricated-house construction. Further, since most of the components used in the preparation of these materials and relatively impervious to gamma radiation, the offer an added protection against such rays when employed in the construction of radiation shelters.

When mixed with cellulosic and plastic materials, or both, these cements produce, in many instances a new product of greater strength than the cellulosic or plastic substances themselves, and much less expensive. Since the cements of the invention bind any mineral, including stones or earth, along with any wood or cellulosic scraps into a homogeneous mass, crushers set up near the site of a demolished building can prepare new material right on the spot. Finally, and by way of further Examples illustrating the possible applications of my improved cements, textile, burlap or nylon materials added to the cement mixture product panels similar to sheetrock but of higher strength than the latter, possessing the added advantage that they are cleaner to work than sheetrock.

The equipment required for the manufacture of these cements is very simple, consisting merely of an oven for the calcination, a grinding mill, mixers, and drying and packaging apparatus.

It will be noted from the foregoing description that there is disclosed a composition of material which includes, in addition to a comminuted filler material which may be organic or inorganic, a cement consisting substantially exclusively of a minor proportion of a siliceous compound, for instance silica and aluminum silicate or mixture of both, and a major proportion of a bonding agent. Manifestly small amounts of additional ingredients, e.g., coloring agents or the aforementioned antimicrobial admixtures, may be included with the principal ingredients referred to. Furthermore, the cements according to the invention are found to have antimicrobial properties.

EXAMPLE IV

A hydraulic binder is prepared by individually calcining calcium chloride, magnesium oxide and magnesium sulfate at a temperature of 750° – 780°C. Each of the calcined components is ground and combined with the others in the following proportions: 3 parts by weight of magnesia MgO, 3 parts by weight of anhydrous magnesium sulfate and 1 to 2 parts by weight of anhydrous calcium chloride $CaCl_2$. The powder is placed in a polyethylene bag and stored in a humid environment for several weeks. No deterioration of the cement was observed.

A comparison was made between a Portland cement composition prepared in accordance with ASTM procedure with 1 part Portland cement and 4 parts of clean washed and sieved sand. This composition was compared with a "soil cement" prepared by mixing 1 part of the powder stored as above with 4 parts by weight of ordinary garden earth containing substantial proportions of organic material in addition to the usual mineral matter. The results and characteristics of the tests are set forth below:

A. Flexural Strength

Tests were conducted in accordance with ASTM C348. Test specimens for each type of mortar were aged for 9 days at room temperature.

| Test Specimen | FLEXURAL STRENGTH - PSI Soil Mortar (Present Invention) | Portland Cement Mortar |
|---|---|---|
| 1A | 309 | 382 |
| 1B | 281 | 418 |
| 2A | 281 | 400 |
| 2B | 315 | 437 |
| 3A | 304 | 406 |
| 3B | 270 | 448 |
| Average | 293 | 415 |

B. Resistance-To-Abrasion Wear

The abrasion-wear tests were conducted after test specimens had cured for 9 days at room temperature.

The Tinius Olsen Wearometer, as specified in Military Specification, Mil-D-3134F, was used.

The wear after 1,000 cycles for each type mortar is shown below. Two test specimens for each mortar were used.

| Soil Mortar The loss in thickness after 1000 cycles of wear: | |
|---|---|
| Specimen No. 1 | 0.101 Inch |
| Specimen No. 2 | 0.096 Inch |
| Average | 0.099 Inch |

| Portland Cement Mortar The loss in thickness after 1000 cycles of wear: | |
|---|---|
| Specimen No. 1 | 0.094 Inch |
| Specimen No. 2 | 0.089 Inch |
| Average | 0.091 Inch |

The foregoing results demonstrate that an expensive Portland cement composition using high quality sand can effectively be replaced by an inexpensive composition such as the soil cement of the present invention using ordinary earth available at all necessary locations. Best results are obtained when 20 – 40 parts by weight of earth or clay are admixed with 10 parts by weight of the cement composition of the present invention. Moreover, it was found that the magnesium oxide (anhydrous) content should be confined between the critical limits of 4.5 – 5.5 parts by weight, the anhydrous magnesium sulfate should be confined to an amount between 2.8 and 3.3 parts by weight while the calcium chloride (anhydrous) should be present in an amount of 1 – 3 parts by weight. Approximately 300 – 400 $cm^3$ of water is required when 1 lb. of the cement composition is admixed with 3 lbs. of earth. The cement may be admixed with water first and then combined with the earth, an exothermic reaction occurring immediately upon addition of the water to the cement.

Tests performed with samples having soil as a component have shown a compression resistance between about 3,000 and 3,500 lbs/in$^2$, or better than 200 kg/cm$^2$.

EXAMPLE V

The hydraulic cement binder produced as described in connection with cement No. 1, is combined with 4 parts by weight of sodium silicofluoride ($Na_2SiF_6$) and about 6 percent by weight of sodium silicate ($Na_2SiO_3$), previously dried to an anhydrous state prior to combining with the composition and after calcination thereof. When this cement binder is used in the systems of Examples I, II, II or IV, the composition is found to have waterproof characteristic and to be less sensitive to crumbling.

EXAMPLE VI

The powders A and B, after mixture and the addition of magnesium sulfate as described for cement No. 2 are combined with anhydrous sodium silicofluoride in an amount of about 5 percent by weight and with about 7½ percent by weight of sodium silicate. Again, the composition made when the cement is used in the Examples I – III, less crumbling and greater waterproof characteristics are observed.

EXAMPLE VII

Cement No. 3 is prepared as described and 6 percent by weight of sodium silicofluoride and 9 percent by weight of sodium silicate are added thereto. The compositions made in accordance with Examples I – III are waterproof and less sensitive to crumbling.

EXAMPLE VIII

The technique of Example I is followed with cements No. 1 – 3 and as modified in Examples V – VII. Prior to the use of the sawdust, however, the sawdust is treated with 43 parts by weight of hydrochloric acid (22 baume) and 64 – 73 percent by weight of water to partially hydrolyze the cellulose over a period of 3 to 5 hours. Thereafter, magnesium carbonate is added in an amount of about 21 parts by weight to neutralize the cellulosic mass to a pH of 6.8 to 7.2 while the cellulosic material is permitted to stand for about ½ to an hour. The neutralized cellulosic mixture is then used directly or after combining it with 32 to 34 parts by weight of magnesium oxide. In all cases, a body of higher compressive strength and improved texture was obtained.

EXAMPLE IX

The cements Nos. 1, 2 and 3 were prepared with the modification described in Examples V – VII except that the aluminum silicate or silica contents thereof was omitted so that the sole silicate contribution was from the sodium silicate. In each case, the hydraulic binder was found to have lower hygroscopicity and to yield a relatively waterproof product.

EXAMPLE X

The cements Nos. 1 – 3 were prepared substituting calcium silicate ($CaSiO_3$) for the aluminum silicate or silica. In each case, the hydraulic binder was capable of use with organic materials and yielded an excellent composite.

EXAMPLE XI

The cements Nos. 1 – 3 and Examples I – VII and X were prepared with calcium chloride substituted for the barium and strontium chlorides in the same molar equivalent. Similar results were obtained.

EXAMPLE XII

Municipal trash was collected and metals and plastic articles removed. The trash was then shredded and glass contained therein crushed to a powder. The refuse consisted of about 70 percent by weight organic material containing cellulose, primarily in the form of paper and shredded vegetable matter, 20 percent by weight glass and 10 percent by weight miscellaneous mineral matter which remained in powder form and was adherent either to the glass or to the organic material. The composition was hydrolyzed with a solution containing 43 parts by weight hydrochloric acid (22° baume) in 57 parts by weight water by forming a slurry and agitating the same. The slurry was permitted to stand for a period of 3 to 5 hours and was then drained, whereupon magnesium oxide was added to neutralize the slurry to a pH of 7. The quantity of original waste, acid and magnesium oxide was such as to produce the equivalent of 2.0 moles of magnesium chloride in the hardened composition. To this mixture is added 13.0 moles of magnesium oxide in excess over that required for complete neutralization, 2.0 moles of magnesium sulfate and 2.0 moles of calcium chloride. The composition is blended with sufficient water to enable it to be cast in molds, and slabs are cast therefrom. The slabs have the characteristics previously described of the hardened composition.

EXAMPLE XIII

The method of Example XII is used except that an equimolar mixture of hydrochloric and sulfuric acids is employed and the quantity of magnesium chloride added is increased by one mole while one mole of calcium oxide is supplied to replace an equivalent amount of calcium chloride. Similar results are obtained.

EXAMPLE XIV

Example XIII was repeated except that the final composition was also provided with 6 parts by weight sodium silicofluoride and 9 parts by weight sodium silicate. The cast compositions were found to have the water resistance described in connection with Example VIII.

EXAMPLE XV

The method of Example XIII was followed except that the equivalent of the silical chloride was supplied as fluosilicic acid in the hydrolysis of the cellulosic waste. Again similar results were obtained.

I claim:

1. A hardenable composition consisting essentially of a hydraulic cement binder and a filler consisting at least in part of cellulosic matter hydrolized with hydrochloric acid or sulfuric acid in an amount of 60 to 70 percent by weight of the composition, said binder in terms of the hardened binder consisting substantially of 1 to 3 moles magnesium chloride, 12.5 to 15.5 moles of magnesium oxide, 1.5 to 2.2 moles magnesium sulfate, and 1 to 3 moles of an alkaline-earth sulfate selected from the group which consists of calcium sulfate, barium sulfate, strontium sulfate and mixtures thereof, with at least part of the sulfate or chloride deriving from the hydrolized cellulosic matter.

2. The composition defined in claim 1 wherein said cellulosic matter consists at least in part of garbage.

3. The composition defined in claim 1, further including substantially 6 percent by weight sodium silicate and 9 percent by weight sodium silicofluoride based on said binder.

4. A method of making a rigid body, comprising the steps of hydrolyzing a cellulosic mass with at least one acid selected from the group which consists of hydrochloric acid, sulfuric acid, fluosilicid acid and mixtures thereof to produce a hydrolyzed mass; at least partially neutralizing said mass with magnesium oxide to a pH of 6.8 to 7.2 to produce a hydrolyzed neutralized mass; adding to the hydrolyzed neutralized mass prior to the setting thereof quantities of at least one compound selected from the group which consists of calcium chloride, strontium chloride, barium chloride and mixtures thereof; and permitting the hydrolyzed neutralized mass to set into a hardened composition of rigid structure, said hardened composition containing substantially 1 to 3 moles magnesium chloride, 12.5 to 15.5 moles magnesium oxide, 1.5 to 2.2 moles magnesium sulfate, and 1 to 3 moles of the alkaline-earth chloride.

* * * * *